US 8,556,118 B2

(12) United States Patent
Hamaguchi

(10) Patent No.: US 8,556,118 B2
(45) Date of Patent: Oct. 15, 2013

(54) MOVING MECHANISM OF MOVABLE BODY

(75) Inventor: Tsuyoshi Hamaguchi, Sagamihara (JP)

(73) Assignee: Nifco Inc., Yokohama-Shi (JP)

( * ) Notice: Subject to any disclaimer, the term of this patent is extended or adjusted under 35 U.S.C. 154(b) by 125 days.

(21) Appl. No.: 13/138,798

(22) PCT Filed: Mar. 31, 2010

(86) PCT No.: PCT/JP2010/055928
§ 371 (c)(1),
(2), (4) Date: Dec. 22, 2011

(87) PCT Pub. No.: WO2010/114057
PCT Pub. Date: Oct. 7, 2010

(65) Prior Publication Data
US 2012/0090244 A1    Apr. 19, 2012

(30) Foreign Application Priority Data

Apr. 1, 2009   (JP) .................. 2009-089411

(51) Int. Cl.
*B65D 43/22*   (2006.01)
(52) U.S. Cl.
USPC ........... 220/830; 220/263; 220/264; 220/827; 220/833; 220/835; 16/304; 74/411.5; 74/412 R; 224/483; 296/37.12; 296/37.14
(58) Field of Classification Search
USPC ................. 220/263, 264, 827, 830, 833, 835; 16/304; 74/411.5, 412 R; 49/333, 358, 49/386; 296/37.12, 37.14; 224/483
See application file for complete search history.

(56) References Cited

U.S. PATENT DOCUMENTS

| 7,743,464 | B2 | 6/2010 | Tomioka et al. |
| 2001/0008358 | A1 | 7/2001 | Brustle |
| 2003/0080131 | A1 | 5/2003 | Fukuo |
| 2003/0189395 | A1 | 10/2003 | Doornbos et al. |
| 2005/0082153 | A1 | 4/2005 | Ichimaru |
| 2005/0133507 | A1 | 6/2005 | Tanaka |
| 2006/0265864 | A1 | 11/2006 | Fukuo |
| 2007/0034636 | A1* | 2/2007 | Fukuo ..................... 220/830 |

FOREIGN PATENT DOCUMENTS

JP       U-S60-194074     12/1985

* cited by examiner

*Primary Examiner* — Anthony Stashick
*Assistant Examiner* — Elizabeth Volz
(74) *Attorney, Agent, or Firm* — Manabu Kanesaka

(57) ABSTRACT

The moving mechanism has a first stationary-side gear part and a second stationary-side gear part provided on a support body side; a movable-side gear part and a pinion gear provided on a supported part of a movable body; and a guide device positioned so that the movable-side gear part engages with the first stationary-side gear part and the pinion gear engages with the second stationary-side gear part. The first stationary-side gear part is formed along an arc of a virtual circle, and has teeth oriented toward a center side of this virtual circle; the second stationary-side gear part is provided adjacent to this first stationary-side gear part on the center side of the aforementioned virtual circle, is formed along an arc of a separate virtual circle from this virtual circle, and has teeth oriented toward a center side of this separate virtual circle.

5 Claims, 6 Drawing Sheets

MOVING MECHANISM OF MOVABLE BODY

TECHNOLOGICAL FIELD

This invention relates to an improvement of a mechanism for rotatably moving a movable body between a reference position and a deployed position without depending on a fixed single shaft.

BACKGROUND TECHNOLOGY

There is a mechanism, in which a door body is combined on a box-form base body rotatably movable between a closed position and an open position, by providing on the box-form base body a first stationary gear part for engaging with an arc-form gear part provided on an arm part of the door body, and providing on the box-form base body a second stationary gear part for engaging with a rotary gear provided on the arm part of the door body. (See Patent Document 1)

Also, there is a mechanism, in which a lid body is combined on a main body rotatably movable between a first position in which an opening of the main body is closed and a second position when the opening is open, by providing on the main body a rack surface for engaging with a pinion body provided on the side of the lid body as a movable body, and providing on the main body a gear part for engaging with a gear provided on this movable body on a part at the center of rotation of this pinion body. (See Patent Document 2)

In the mechanisms thus configured, the door body or lid body serving as the movable body can be rotated without depending on a fixed single shaft. On the other hand, there may be a case when an external force in the direction of pushing the door or lid into the box-form base body or main body is applied to the door or lid when this is in the open position or first position. In the mechanism of Patent Document 1, this force is applied directly to the rotary gear of the door body, because this rotary gear is positioned directly above the second stationary gear part. Also, in the mechanism of Patent Document 2, this force is likewise applied directly to the lid body, because the gear of this lid body is positioned directly above the gear part of the main body.

PRIOR ART DOCUMENTS

Patent Documents

Patent Document 1: Japanese Patent Publication No. 3833925
Patent Document 2: Japanese Unexamined Patent Publication No. 2006-328790

SUMMARY OF THE INVENTION

Problem to be Solved by the Invention

The main problem to be solved by this invention, in such mechanism being configured so that a movable body is rotated without depending on a fixed single shaft, is to ensure that in the case when an external force is applied to the movable body, this force is not applied directly to the comparatively brittle and weak parts of such mechanism.

Means for Solving the Problem

In this invention, the moving mechanism of a movable body is configured according to (1) to (4) below in order to solve the aforementioned problem.

(1) The invention is a moving mechanism of a movable body assembled rotatably movable between a reference position and a deployed position on a support body by way of a supported part;

(2) comprising a first stationary-side gear part and a second stationary-side gear part provided on the support body side; a movable-side gear part and a pinion gear provided on the supported part of the movable body; and a guide device positioned so that the movable-side gear part engages with the first stationary-side gear part and the pinion gear engages with the second stationary-side gear part;

(3) wherein the first stationary-side gear part is formed along an arc of a virtual circle, and has teeth oriented toward a center side of this virtual circle; and (4) the second stationary-side gear part is provided adjacent to this first stationary-side gear part on the center side of the aforementioned virtual circle, is formed along an arc of a separate virtual circle from this virtual circle, and has teeth oriented toward a center side of this separate virtual circle.

Because the movable-side gear part provided on the supported part is placed inside the first stationary-side gear part on the support body side and the pinion gear is placed inside the second stationary-side gear part on the support body side, firstly, the movable body is rotated between the reference position and the deployed position without relying on a fixed single shaft. Also, secondly, in the case when an external force toward the direction of releasing the inside placements of the movable-side gear part and the pinion gear is applied to the side of the movable body when this movable body is in the reference position, this force is not applied to the movable-side gear part and the pinion gear, but is received by the aforementioned guide device. It can thereby be ensured that damage, or the like, is not caused to the aforementioned movable-side gear part and pinion gear in the case when such external force is applied.

The aforementioned movable body may be provided with the supported part on an inner face side of a lid for closing an opening of the support body in the reference position; and in this reference position, a part of the first stationary-side gear part may be positioned between the lid and the movable-side gear part, and a part of the second stationary-side gear part may be positioned between the lid and the pinion gear. If so, then it can be ensured that in the case when an external force sufficient to push the lid into the support body is applied to the lid in the reference position, this force is not applied directly to the movable-side gear part and the pinion gear.

A favorable mode of configuration of this invention is such that: the movable-side gear part is formed along an arc of a virtual circle; and the guide device are constituted by a shaft body provided in a center position of this virtual circle, and a slot part provided on the support body side for receiving this shaft body.

A contacted part to contact a part of the supported part when an external force is applied to the lid in the reference position may be provided on the support body side. If so, then it can be ensured that in the case when an external force is applied from above to the lid in the aforementioned reference position, a part of this external force is received also by this contacted part.

The pinion gear may be provided as a part of a damper device, or may be linked with a damper device, so that a damping force is applied to rotation thereof. If so, then it can be ensured that even in the case when the aforementioned rotation of the movable body is enforced by urging of urging means, this rotation is decelerated to a suitable degree.

Effect of the Invention

According to this invention, because the movable-side gear part is placed inside the first stationary-side gear part and the pinion gear is placed inside the second stationary-side gear part, it can be ensured that in the case when an external force is applied to the movable body, this force is not applied directly to the movable-side gear part and the pinion gear. It can thereby be ensured that, for example, in the case when such movable body is provided as a lid, or the like, as an interior fixture of an automobile, or the like, damage, or the like, is not caused to the moving mechanism of this lid to the extent possible, even when a downward load is applied to this lid by placing a hand, or the like, on this lid in the closed position as the reference position.

EMBODIMENT OF THE INVENTION

An embodiment of this invention is described below based on FIGS. 1 to 6. Each drawing depicts a storage device configured so that movement of a lid 2' as a movable body 2 is controlled by application of the moving mechanism according to this invention. In particular, FIGS. 4 and 5 respectively illustrate states when such movable body 2 is in the deployed position.

The moving mechanism of the movable body 2 according to this embodiment is used for assuring regular movement of the movable body 2 between the reference position and the deployed position without depending on a fixed single shaft.

Such moving mechanism can be used, for example, as a moving mechanism of a lid, door, arm, or the like, in a device provided with such lid, or the like, to be rotatably movable. In the illustrated example, such moving mechanism is used as a moving mechanism of a lid 2' as a movable body, to be positioned roughly horizontally in the reference position to close from above an opening 10 on a case 1' as a support body 1 having this opening 10 on an upper face.

Figure 4:
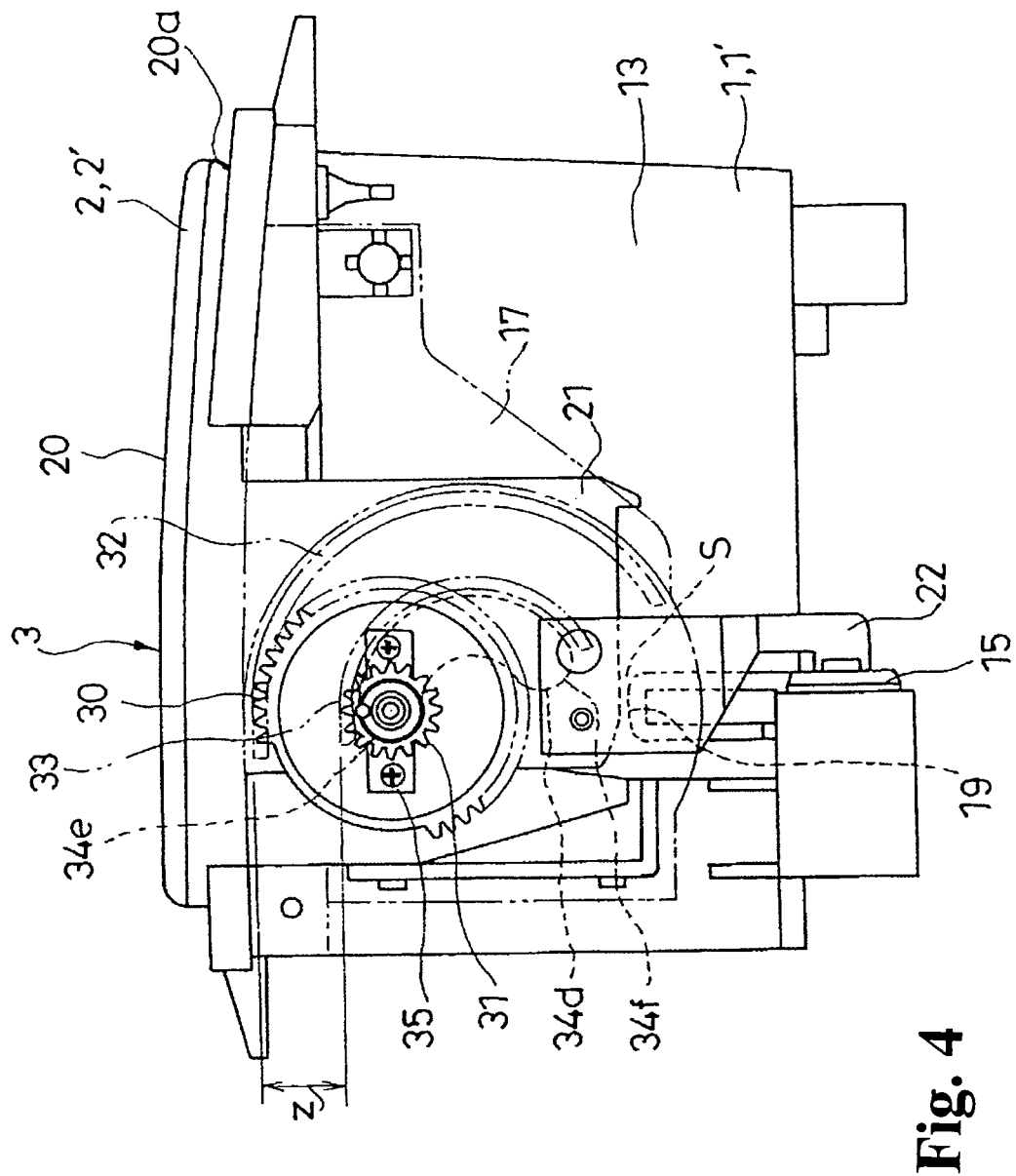
FIG. 4 is a structural diagram in side view showing from the left side the moving mechanism provided on the left side of the case as the support body.
Figure 5:
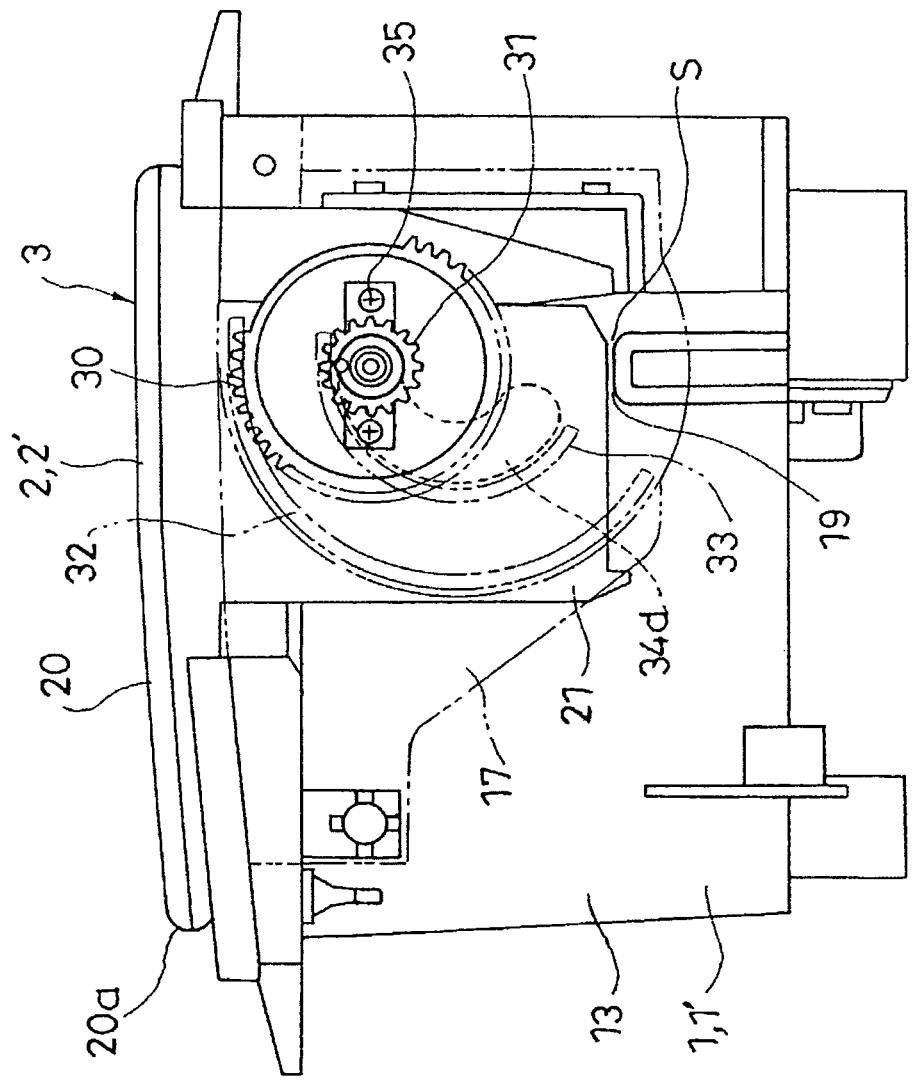
FIG. 5 is a structural diagram in side view showing from the right side the moving mechanism provided on the right side of the case as the support body.
Figure 6:
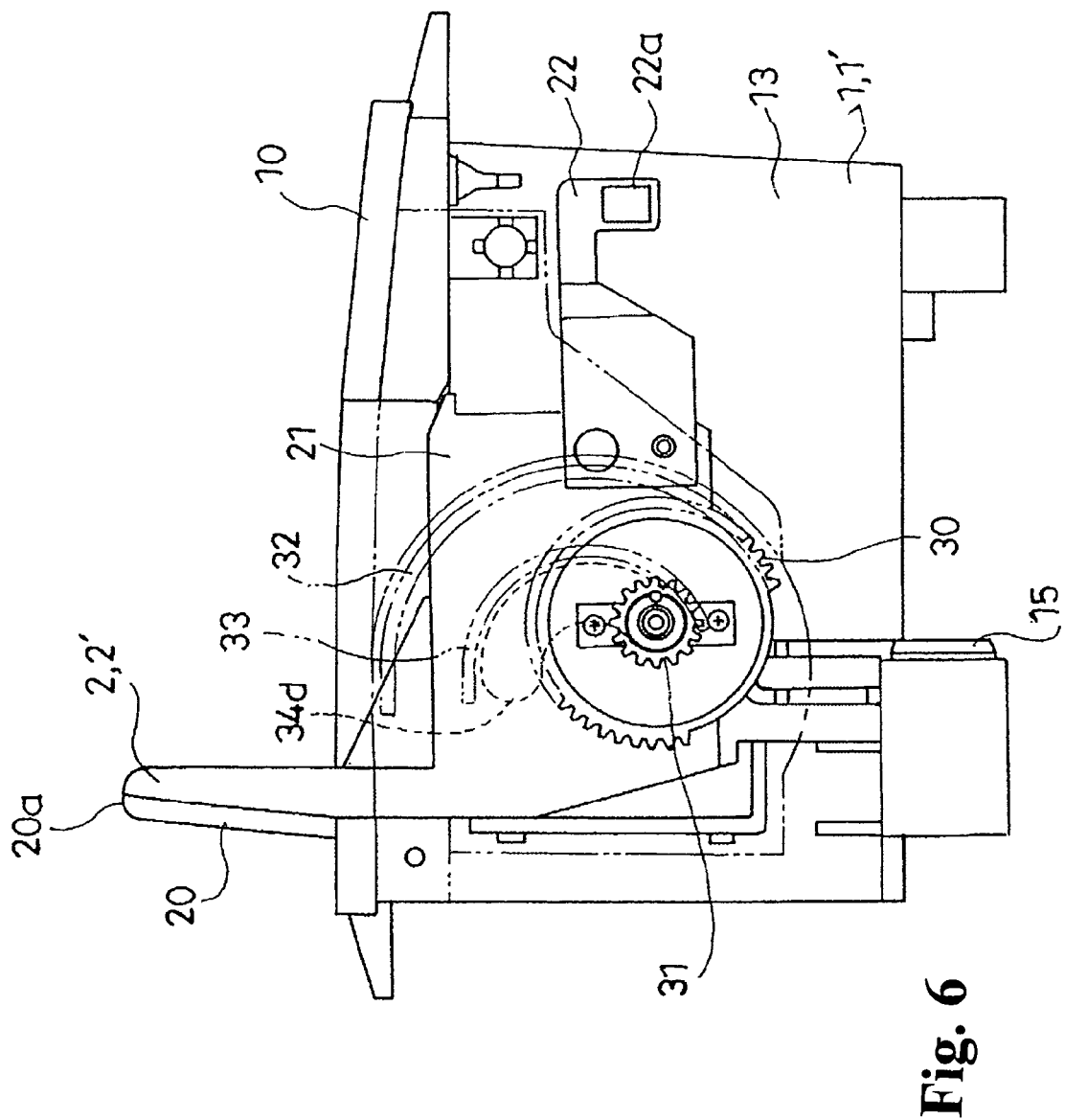
FIG. 6 is a structural diagram in side view showing from the left side the moving mechanism provided on the left side of the case as the support body.

The movable body 2 is combined on the support body 1 rotatably movably by way of a supported part 21. In the illustrated example, the case 1' as the support body 1 has a front plate 11, a rear plate 12, left and right side plates 13 and 13, and a bottom plate 14, and is configured so that the opening 10 is narrow in a front-to-back direction x and wide in a left-to-right direction y. The corresponding lid 2' as the movable body 2 has a lid main body 20 having a roughly rectangular plate form, and supported parts 21 are provided respectively on both the left and right sides of this lid main body 20. Each of the left and right supported parts 21 is configured as a plate form arranged along the front-to-back direction x, with the plate surface oriented roughly orthogonally to the surface of the lid main body 20. Also, each of the left and right supported parts 21 and 21 is positioned beneath the lid main body 20 in the reference position. Also, in the illustrated example, the left-side supported part 21 is positioned on the outside of the left-side side plate 13 of the support body 1, and the right-side supported part 21 is positioned on the outside of the right-side side part 13 of the support body 1, to be supported on the support body 1 on the respective sides. (FIGS. 4 and 5)

In the illustrated example, a movable-side gear part 30 and a pinion gear 31 are provided on an outer face part of such supported part 21. Such movable-side gear part 30 engages with a first stationary-side gear part 32, and the pinion gear 31 engages with a second stationary-side gear part 33, on the support body 1 side to be described.

The movable-side gear part 30 is integrally provided on the supported part 21 by forming a circular uplifted part 21a on the outer face of the supported part 21, and providing gear teeth on a step part of the supported part 21 formed by this circular uplifted part 21a, that is, an edge part of the circular uplifted part 21a. That is, the movable-side gear part 30 assumes a rack form formed along an arc of a virtual circle.

Figure 3:
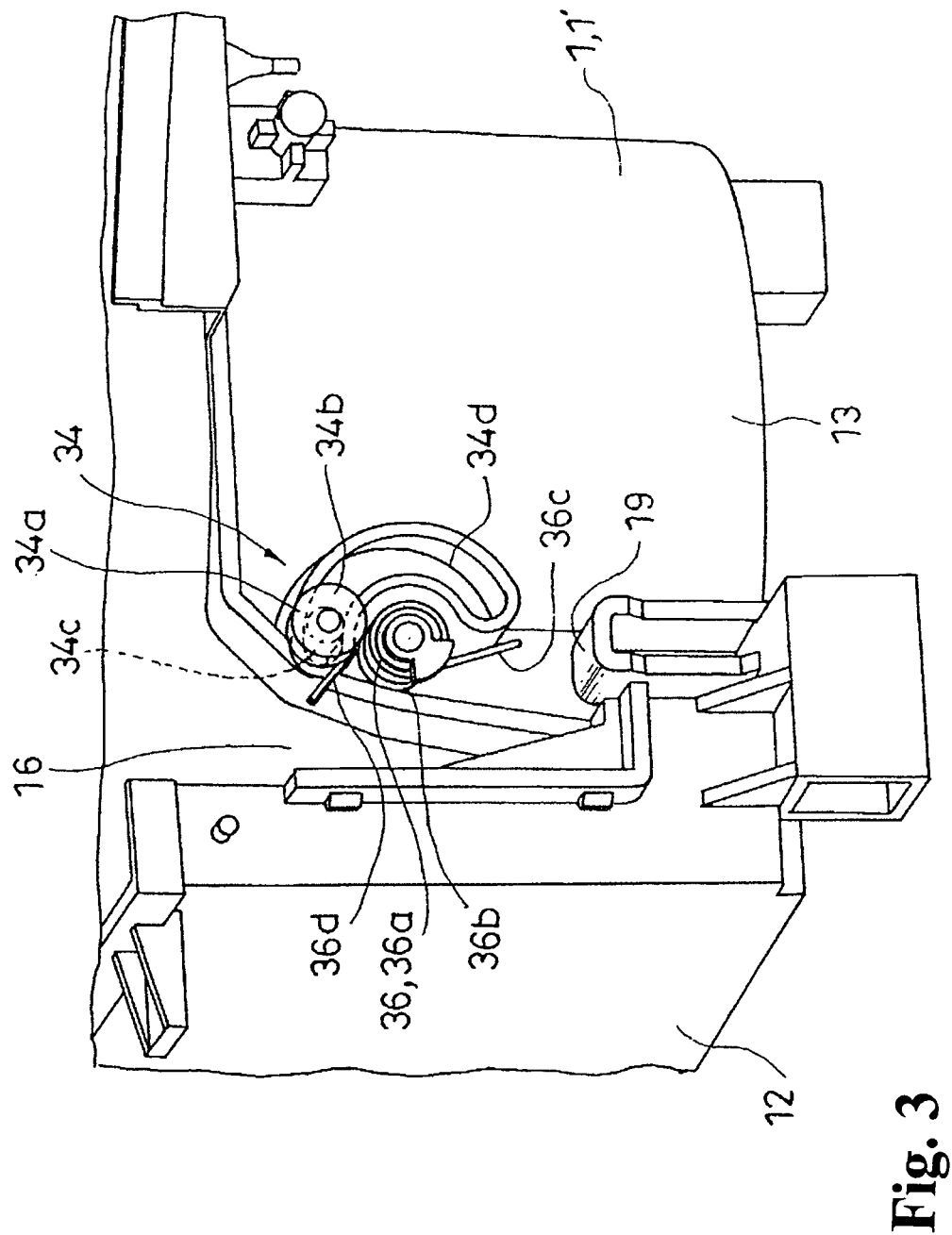
FIG. 3 is a structural diagram in perspective view showing the main parts on the left side of the storage device without the lid.

A circular through-hole 30a running through the supported part 21 in the left-to-right direction is formed in the center of such movable-side gear part 30. In the illustrated example, a shaft body 34a has a leg part 34c to be inserted into this through-hole 30a and a head part 34b not fitting into this through-hole 30a, and the leg part 34c, inserted into this through-hole 30a and projecting on the inner face side of the supported part 21a, is received with a little gap in a slot part 34d, to be described, formed on the side plate 13 of the support body 1, so that the aforementioned movable-side gear part 30 engages with the first stationary-side gear part 32 and the pinion gear 31 engages with the second stationary-side gear part 33. That is, in this embodiment, a guide device for assuring the aforementioned engagement is configured by such shaft body 34a and slot body 34d. FIG. 3)

Also, in the illustrated example, the through-hole 30a of such movable-side gear part 30 is formed on the bottom of a recess 30b formed in the center part of this movable-side gear part 30. Also, in the illustrated example, the pinion gear 31, being a part of a damper device 35, is provided on the outer face part of the supported part 21 using this recess 30b. Such damper device 35 has a shaft part, not illustrated, of the pinion gear 31 axially supported on a main body part 35a fitted into the aforementioned recess 30b. Also, a resistance (damping force) is applied to the rotation or relative rotation of this shaft part, that is, the pinion gear 31, and a damping force is applied to the rotation of the movable body 2 by the resistance thus applied. Typically, silicon oil or other viscous fluid is filled in the main body part 35a constituting such damper device 35, and the viscosity resistance of this viscous fluid is applied to the rotation of the aforementioned shaft part. In the illustrated example, the damper device 35 is anchored to the supported part 21, using ear parts 35b formed on both sides in the diameter direction of the main body part 35a of the damper device 35. The rotation center shaft of the pinion gear 31 is arranged in the left-to-right direction, and this rotation center shaft is positioned in the center of the movable-side gear part 30. The pinion gear 31 is positioned outside the aforementioned recessed 30b, and the pinion gear 31 accordingly engages with the second stationary-side gear part 33, to be described, at a position further outside from the movable-side gear part 30.

Figure 1:
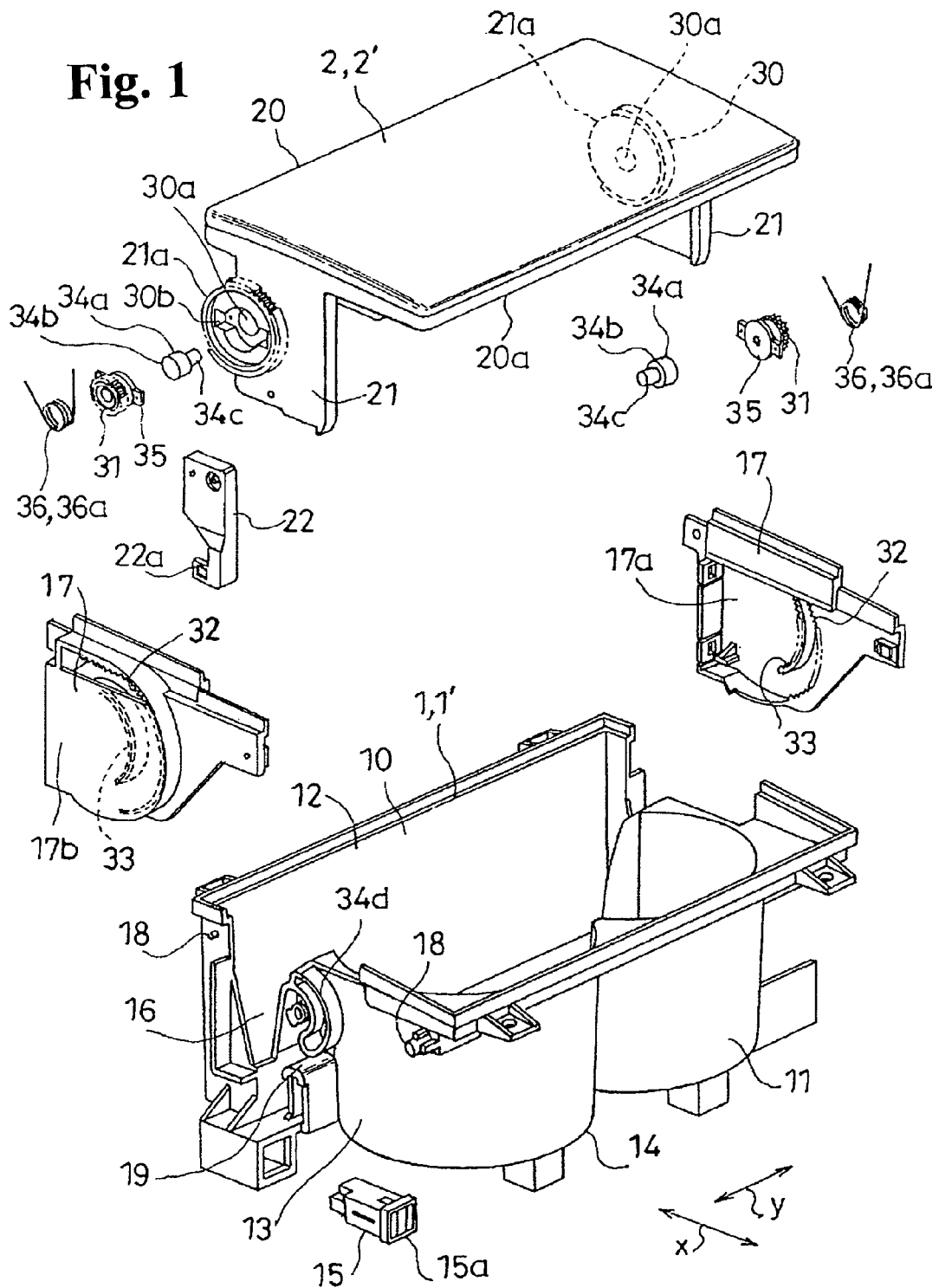
FIG. 1 is a structural diagram in perspective view of a storage device having a lid as the movable body.
Figure 2:
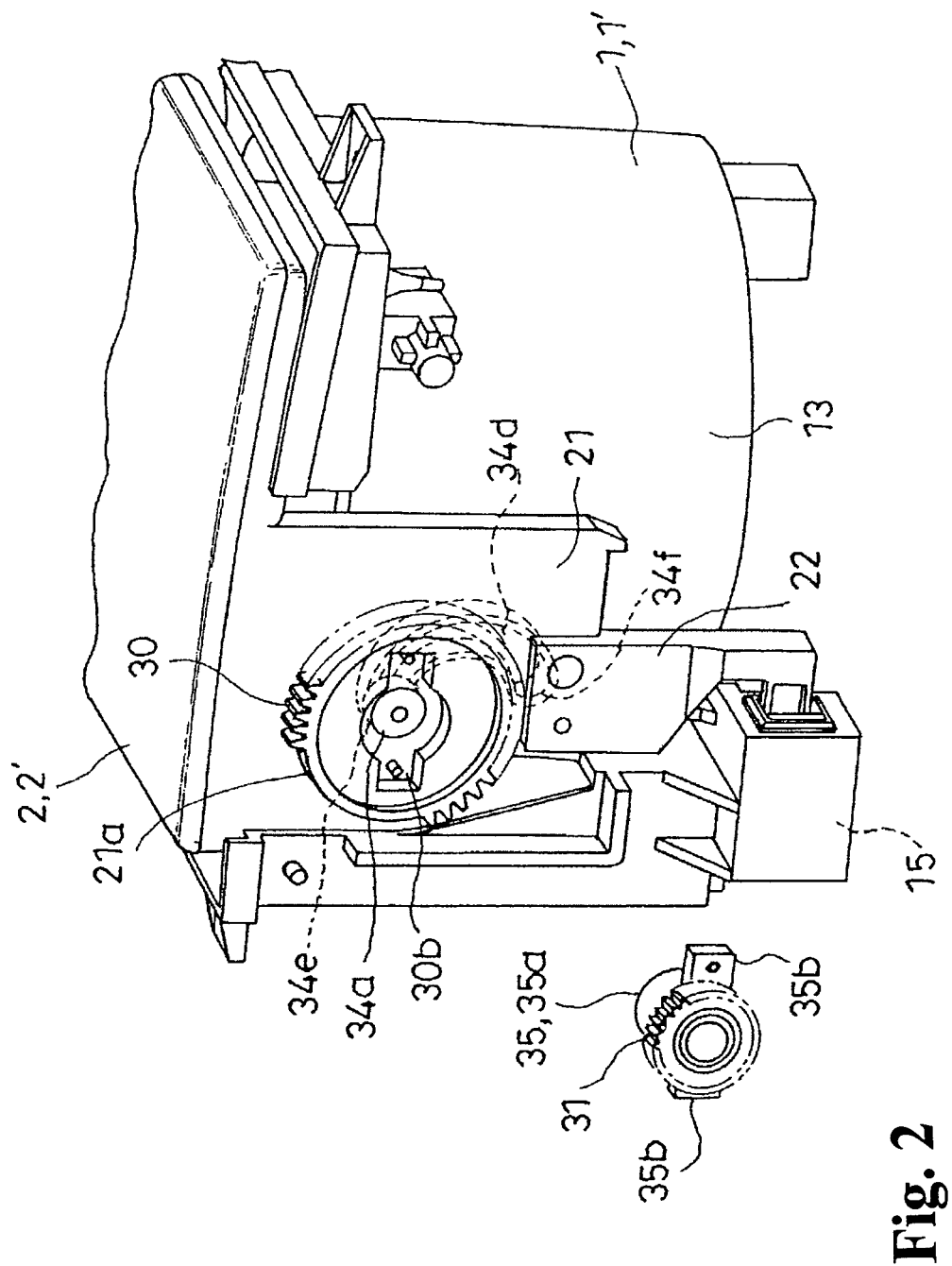
FIG. 2 is a structural diagram in perspective view showing the main parts on the left side of the storage device without the cover body.

Also, in the illustrated example, on the supported part 21 of the movable body, on the left side of the lid 2' illustrated in FIG. 1, there is provided an elongated arm 22, having an upper end side connected to a lower part of such supported part 21, and having a striker part 22a projecting toward the rear on a lower end side, when the movable body 2 is in the reference position. On the outside of the side plate 13 of the case 1' as the support body 1, there is provided a latch device 15 for receiving the striker part 22a of such elongated arm 22 from the front and catching the same using an internal catcher 15a. In the illustrated example, the state in which the movable body 2 is in the reference position is maintained by such latch device 15. Such latch device 15 is configured so that the catcher 15a releases the striker part 22a when the striker part 22a is further pushed into the inner depth side of the latch device 15 from the state in which the striker part 22a is caught. (This pushing-in is referred to as "first pushing-in.") In the illustrated example, a front end 20a of the lid main body 20 is pushed in downward from the state in which the lid 2' as the movable body 2 is in the reference position, the striker part 22a is pushed into the inner depth side of the latch device 15 by this pushing-in, the catching of the striker part 22a by the latch device 15 is released by the pushing-in operation of the front end 20a of this lid main body 20, and the lid 2' as the movable body 2 is forcibly rotated up to the deployed position (position in FIG. 6) by urging of urging means 36 to be described. In the illustrated example, between the rear edge of the side plate 13 and the rear plate 12 constituting the case 1', there is formed a gap 16 for avoiding interference with the place of connection with the lid main body 20 on the supported part 21 in the course of rotation to the deployed position of the lid 2'. When the lid 2', having been rotated up to the deployed position, is rotated in return up to the reference position, the striker part 22a again enters into the latch device 15 at the end of this return movement. The catcher 14a of the latch device 15, having released the striker part 22a by the aforementioned first pushing-in, again catches the striker part 22a when the striker part 22a is pushed in a second time by again entering into the latch device 15. The state in which the movable body 2 is in the reference position is again maintained thereby.

The support structure on the right side of the lid 2' illustrated in FIG. 5 is substantially identical to the support structure on the left side of the lid 2' illustrated in FIG. 4, except that the aforementioned latch device 15 and elongated arm 22 are not present.

Meanwhile, the first stationary-side gear part 32 and second stationary-side gear part 33 constituting the moving mechanism are provided on the aforementioned case 1' as the support body 1. Such first stationary-side gear part 32 engages with the movable-side gear part 30 of the aforementioned movable body 2, and the second stationary-side gear part 33 engages with the aforementioned pinion gear 31.

In the illustrated example, such first stationary-side gear part 32 and second stationary-side gear part 33 both are formed on a side part of the support body 1, in the illustrated example, on the side of an inner face 17a, oriented toward the side part of this support body 1, of a cover body 17 for receiving the supported part 21 of the movable body 2 between this side and the outer face of the side part 13 of the case 1'.

In the illustrated example, the cover body 17 assumes a plate form, and is fastened by screws using installation parts 18 formed on the outer face of the side plate of the case 1', opening a space for receiving the aforementioned supported part 21 between the cover body 17 and the outer face.

Also, this cover body 17 comprises:
the first stationary-side gear 32, being formed along an arc of a virtual circle, and having teeth oriented toward the center side of this virtual circle; and
the second stationary-side gear part 33, being provided adjacent to this first stationary-side gear part 32 on the center side of this virtual circle, being formed along an arc of a separate virtual circle from this virtual circle, and having teeth oriented toward the center side of this separate virtual circle.

In the illustrated example, such first stationary-side gear part 32 and second stationary-side gear part 33 both are provided so that the centers of the aforementioned virtual circles are positioned on the side of the rear plate 12 of the case 1', and both gear parts 32 and 33 continue in the top-to-bottom direction so that the insides of the curves are oriented toward the side of the rear plate 12. Also, such first stationary-side gear part 32 and second stationary-side gear part 33 both present rack forms following arcs having a range of roughly 90 degrees centered on the centers of the aforementioned virtual circles. Also, the second stationary-side gear part 33 is positioned further to the side of the outer face of the cover body 17 from the first stationary-side gear part 32, the distance between both gear parts 32 and 33 is roughly equal regardless of the position in the direction of continuation thereof, and this distance is roughly congruent with a distance z (FIG. 4) between the outer perimeter of the pinion gear 31 and the movable-side gear part 30 on a virtual line extending in the radial direction from the center of this movable-side gear part 30.

Also, in this embodiment, a slot part 34d for receiving the leg part 34c of the shaft body 34a constituting one of said guide device 34 is formed on the side face 13 of the case 1' further toward the rear from the position of formation of the second stationary-side gear part 33. This slot part 34d is formed so as to follow an arc of a virtual circle having a center positioned at the center of the aforementioned virtual circles followed by the aforementioned first stationary-side gear part 32 and second stationary-side gear part 33, and having a smaller diameter than these virtual circles. This slot part 34d also continues in the top-to-bottom direction so that the inside of the curve is oriented toward the side of the aforementioned rear plate 12.

Because the movable-side gear part 30 provided on the supported part 21 is placed inside the first stationary-side gear part 32 on the support body 1 side and the pinion gear 31 is placed inside the second stationary-side gear part 33 on the support body 1 side, the movable body 2 is rotated between the reference position and the deployed position without relying on a fixed single shaft. In the illustrated example, when in the reference position, the movable-side gear part 30 is placed inside the upper part of the first stationary-side gear part 32, the pinion gear 31 is placed inside the upper part of the second stationary-side gear part 33, and the shaft body 34a is furthermore positioned on the upper end 34e side of the slot part 34d. That is, the movable body 2 is such that the supported part 21 is provided on the inner face side of the lid 2' for covering the opening 10 of the case 1' as the support body 1 in the reference position, and in this reference position, a part of the first stationary-side gear part 32 is positioned between the lid 2' and the movable-side gear part 30, and a portion of the second stationary-side gear part 33 is positioned between the lid 2' and the pinion gear 31. When the front end 20a of the lid main body 20 constituting the movable body 2, in this reference position, is push-in operated so that the latch device 15 releases the striker body 22a, a force in a direction toward the side of a lower end 34f of the slot body 34d is applied to the shaft body 34a by urging of urging means to be described. The movable-side gear part 30 running through the first stationary-side gear part 32 is therefore rotated in the counterclockwise direction in FIG. 4 centered on the shaft body 34a, and the pinion gear 31 running through the second stationary-side gear part 33 also is rotated in the counterclockwise direction in FIG. 4; the lid 2' moves downward while standing up in a direction so that the front end 20a is oriented upward, and reaches the deployed position where further movement is restricted, and the opening 10 of the case 1' is thus opened. (FIG. 6) It can thereby be ensured that the track of movement of the front end 20a of the lid main body 20 is kept down to a lower level in the course of opening movement, compared with the case when the lid 2' is rotated centered on a fixed single shaft.

In this deployed position, the shaft body 34a is positioned at the lower end 34f of the slot part 34d. In the case if an external force toward the direction of releasing the inside placements of the movable-side gear part 30 and the pinion gear 31 is applied to the side of the movable body 2 when this movable body 2 is in the reference position, i.e. in the illustrated example, when the external force is applied from above to the lid 2', this force is not applied to the movable-side gear part 30 and the pinion gear 31, but is received by the aforementioned guide device 34. It can thereby be ensured that damage, or the like, is not caused to the aforementioned movable-side gear part 30 and pinion gear 31 in the case when such external force is applied. In the illustrated example, the leg part 34c of the shaft body 34a positioned on the upper end 34e side of the slot part 34d is pushed from above against the slot inner wall on the side of the upper end 34e of this slot part 34d, so that the aforementioned external force is received.

In this embodiment, a contacted part 19, contacted by a part of the aforementioned supported part 21 when an external force is applied to the aforementioned lid 2' in case the movable body 2 is in the reference position, is further provided on the side of the support body 1. In the illustrated example, such contacted part 19 is constituted by an upper part of an uplifted part formed in a position directly beneath the lower end 34f of the aforementioned slot part 34d on the outer face of the side plate 13 of the case 1'. Also, in the case when an external force is applied from above to the lid 2', in the aforementioned reference position, in an amount of a clearance "s" formed between this contacted part 19 and the lower end of the supported part 21, the supported part 21 moves downward and strikes the contacted part 19, so that a part of this external force is received also by the contacted part 19.

Also, in this embodiment, the movable body 2 in the reference position is forcibly rotated toward the deployed position by urging means 36. In the illustrated example, such urging means 36 are constituted by a torsion coil spring 36a, provided on the outside of the side plate 13 of the case 1' as the support body 1, in a state in which a winding part 36b of the spring is fixed in position on the inside of the curve of the aforementioned slot part 34d, and this winding part 36b is elastically deformed with one end 36c of the spring being constantly pressed against the side plate 13 of the case 1' and the other end 36d of the spring being constantly pressed against the leg part 34c of the aforementioned shaft body 34a. In the illustrated example, such torsion coil spring 36a accumulates urging force in the direction of bringing the other end 36d of the spring closer to the one end of the spring 36c in the clockwise direction in FIG. 3 by the aforementioned elastic deformation of the winding part 36b. When the catching of the striker part 22a of the aforementioned latch device 15 is released in the aforementioned reference position, a force toward the lower end 34f side of the slot part 34d is thereby applied to the shaft body 34a and the lid 2' is forcibly rotated up to the deployed position as previously mentioned. This rotation is decelerated to a suitable degree by the pinion gear 31 serving as a part of the aforementioned damper device 35.

The entire contents of the specification, claims, drawings, and abstract of Japanese Patent Application No. 2009-089411 filed on Apr. 1, 2009 are incorporated by reference herein as a disclosure of the specification of the present invention.

What is claimed is:

1. A moving mechanism of a movable body assembled for rotatably moving between a reference position and a deployed position on a support body by way of a supported part, comprising:
   a first stationary-side gear part and a second stationary-side gear part, arranged on a side of the support body;
   a movable-side gear part and a pinion gear, arranged on the supported part of the movable body; and
   a guide device for positioning the movable-side gear part to engage the first stationary-side gear part and the pinion gear to engage the second stationary-side gear part;
   wherein the first stationary-side gear part is formed along an arc of a virtual circle, and has teeth oriented toward a center side of the virtual circle; and
   the second stationary-side gear part is disposed adjacent to the first stationary-side gear part on the center side of said virtual circle, is formed along an arc of a separate virtual circle from the virtual circle, and has teeth oriented toward a center side of the separate virtual circle.

2. A moving mechanism of a movable body according to claim 1, wherein the movable body has the supported part on an inner face side of a lid for closing an opening of the support body in the reference position; and
   in the reference position, the first stationary-side gear part is positioned between the lid and the movable-side gear part, and the second stationary-side gear part is positioned between the lid and the pinion gear.

3. A moving mechanism of a movable body according to claim 1, wherein the movable-side gear part is formed along an arc of a virtual circle; and
   the guide device comprises a shaft body arranged in a center position of the virtual circle, and a slot part arranged on the side of the support body for receiving the shaft body.

4. A moving mechanism of a movable body according to claim 1, wherein the pinion gear is provided as a part of a damper device, or is linked with a damper device to apply a damping force to the rotation thereof.

5. A moving mechanism of a movable body according to claim 2, wherein a contacted part contacted by a part of the supported part when an external force is applied to the lid in the reference position is provided on the support body side.

* * * * *